Patented June 17, 1952

2,600,465

UNITED STATES PATENT OFFICE 2,600,465

METHOD OF OXIDIZING ACIDIC SULFUR COMPOUNDS OF THE TYPE WHICH OCCUR IN HYDROCARBON OIL

Donald C. Bond, Northbrook, Ill., assignor to The Pure Oil Company, Chicago, Ill., a corporation of Ohio No Drawing. Application February 14, 1946, Serial No. 647,664

11 Claims. (Cl. 196—29)

This invention relates broadly to the oxidation of acidic sulfur compounds, and more specifically to the conversion of acidic sulfur compounds in hydrocarbon fluids to non-acidic compounds of better odor, and to the regeneration of alkali solutions which have been used to extract such sulfur compounds from hydrocarbon fluids.

It is well known that hydrocarbon oils such as gasoline, and other distillates, can be sweetened by oxidizing acidic sulfur compounds, such as mercaptans, contained in such distillates in the presence of an alkali solution containing a small amount of a phenolic oxidation promoter. Compounds which have been used as oxidation promoters are polyhydric phenols which are capable of being oxidized to the quinone form, and tannic acid.

It is also known to extract acidic sulfur compounds such as mercaptans from hydrocarbon fluid by means of alkali solutions and to regenerate such solutions by means of air, or other oxidizing agent in the presence of a small amount of a phenolic oxidation catalyst.

I have discovered that the catalytic effect of hydroxy aromatic compounds and substances containing the same as oxidation promoters is enhanced by substituting one or more alkoxy-groups for hydrogen in a benzene ring to which the hydroxy groups are attached. Those aromatic compounds containing a single benzene ring with at least two hydroxy groups attached thereto in positions either ortho or para to each other are preferred. One or more alkoxy groups may be substituted for hydrogen in the benzene ring. As examples of compounds which I have found to be effective as oxidation promoters may be mentioned 3-methoxy catechol, 3-ethoxy catechol, 3-isopropoxy catechol and the corresponding hydroquinone isomers. In order to demonstrate the effectiveness of the alkoxy group in enhancing the oxidation promoting ability of a compound, a series of tests were run in which 1% by weight of n-butyl mercaptan was added to an aqueous solution containing 10% by weight of caustic soda. 50 cc. of the resulting solution was placed in a 100 cc. graduated cylinder filled to the 75 cc. mark with No. 4 glass beads. Air was bubbled through the solution for one hour at the rate of 0.03 cubic foot per hour by means of a tube reaching to the bottom of the cylinder. After the solution had been blown for one hour with air at room temperature (approximately 75° F.) it was extracted with approximately 100 cc. of V. M. P. naphtha to remove the disulfides that had formed. The resulting naphtha containing the disulfides was treated with acidic silver nitrate to remove any unoxidized mercaptans and the solution was then analyzed for disulfides. The foregoing test was made on a blank alkali solution and on solutions containing 1% each of the following substances: catechol, hydroquinone, 1-monomethyl ether of pyrogallol, 1-monoethyl ether of pyrogallol, 1-monoisopropyl ether of pyrogallol and U. O. P. Inhibitor No. 1 (a hard wood tar fraction boiling between 240 and 300° C.). The results of the tests are tabulated in the following table:

Table

| Solution | Percent of the butyl mercaptan oxidized |
|---|---|
| 10% aq. NaOH | 0.9 |
| 10% aq. NaOH, 1% Catechol | 4.7 |
| 10% aq. NaOH, 1% Hydroquinone | 14.6 |
| 10% aq. NaOH, 1% 1-Monomethyl Ether of Pyrogallol (3-methoxy catechol) | 20.7 |
| 10% aq. NaOH, 1% 1-Monoethyl Ether of Pyrogallol (3-ethoxy catechol) | 18.7 |
| 10% aq. NaOH, 1% 1-Monoisopropyl Ether of Pyrogallol (3-isopropoxy catechol) | 46.4 |
| 10% aq. NaOH, 1% U. O. P. Inhibitor No. 1 | 19.8 |

From a comparison of the amount of butyl mercaptan oxidized with the various phenolic compounds it is evident that the addition of the alkoxy group improved the ability of catechol to oxidize the butyl mercaptan to disulfide. It is also evident that 1-monoisopropyl ether of pyrogallol had a much greater effect than the other two ethers tested. The branched-chained alkyl groups are more effective than straight-chained alkyl groups in enhancing the catalytic property of the phenol.

The 1-monoisopropyl ether of pyrogallol was prepared in the following manner: 60 g. pyrogallol was dissolved in 400 cc. formula 30 alcohol. 30 g. of KOH was added and the mixture was heated to the boiling point and 125 g. of isopropyl iodide was added dropwise. The mixture was refluxed for 10 hours and most of the solvent was distilled off. Then 400 cc. of water was added to the residue and the solution was acidified with dilute HCl. The solution was then extracted three times with ether. The ether was distilled from the ether extract and the residue was distilled under reduced pressure. The fraction boiling at 145° C. at 15 mm. pressure was collected. The material was crystallized from benzene to give a product having a melting point of 117° C. Recrystallization of this material from benzene gave a product having a melting point of 118° C.

A third crystallization gave a material whose melting point was also 118° C., thus showing that the compound was pure.

Alkali solutions containing alkoxy-substituted phenols are useful as oxidation promoters for oxidizing acidic sulfur compounds by means of air or other oxygen-containing gas. Alkoxy-substituted phenols are also useful as oxidation catalysts in the regeneration of alkali solutions which have been used to extract acidic sulfur compounds from hydrocarbon fluids such as hydrocarbon oils and gases, as well as other fluids which are immiscible with the alkali solution. They are particularly useful in the regeneration of aqueous and alcoholic alkali solutions which have been used to extract mercaptans from gasoline and other light hydrocarbon distillates.

Catalysts in accordance with my invention are useful in connection with both aqueous and non-aqueous alkali solutions, as for example solutions of alkali in monohydric and polyhydric alcohols and ketones. Examples of solvents other than water which may be used for the alkali are methyl alcohol, ethyl alcohol and glycol, and mixtures thereof with each other and/or with water.

If the invention is used for converting sulfur compounds from an acidic or malodorous form to a non-acidic or form having a sweet odor, the fluid containing such acidic sulfur compounds is contacted with air, or other oxygen-containing gas in the presence of alkali solution non-miscible therewith containing a small amount of the oxidation promoter. Alkali solutions containing approximately from 5 to 30% by weight of free alkali metal hydroxide, preferably sodium or potassium hydroxide, are preferred. The catalyst may be present in amounts ranging from approximately 0.1 to 3% by weight, and ordinarily about 1% of catalyst is satisfactory. The fluid and the alkali may be brought into contact in any suitable fashion, as for example by flowing the fluid and oxygen-containing gas in countercurrent contact with the solution in a packed tower. Where the purpose is to sweeten the fluid, the rate of addition of oxygen-containing gas used will be regulated so as not to cause undue loss of light constituents of the hydrocarbon or other fluid being treated by being carried away in the exhaust gas. Oxidation should be controlled so as to prevent destruction of the catalyst by oxidation. The amount of alkali solution in relation to the hydrocarbon or other fluid being treated may vary over wide limits, but I prefer to use a ratio of 5 to 50 parts of alkali solution to 100 parts of hydrocarbon or other fluid being treated.

Where the object of the invention is to regenerate alkali solution which has been used to extract mercaptans or other acidic sulfur compounds from the hydrocarbon or other fluid, the fluid is contacted with a suitable alkaline solution as hereinbefore described in connection with sweetening, under non-oxidizing conditions in a countercurrent contact tower. The ratio of solution of hydrocarbon or other fluid undergoing treatment will be approximately 5 to 50 parts by volume of solution to 100 parts of fluid. The alkali solution after contact with the hydrocarbon or other fluid is separated therefrom and regenerated in a separate regenerating tower by contact with air or other oxidizing gas, the amount of air or oxidizing gas being regulated so as to avoid destruction of the catalyst. The catalysts used in my invention are susceptible to destruction by over-oxidation. In order to prevent destruction of the catalyst the mercaptide or acidic sulfur content of the alkali solution should be reduced to as low a point as possible without causing destruction of the catalyst. The point to which the mercaptans, or other acidic compounds can be reduced will depend upon the specific catalyst used, but ordinarily should not be reducede below approximately 0.05% by weight of mercaptan sulfur, and preferably not below 0.2% of mercaptan sulfur. Care should be exercised to prevent accumulation of heavier mercaptans in the alkali solution since such compounds may re-enter the hydrocarbon or other fluid with which the regenerated solution is contacted. It is advisable to permit the regenerated solution to stand for a period of approximately 15 to 30 minutes after regeneration before contacting it with additional quantities of fluid in order to allow time for any quinones formed during the regeneration step to be reduced back to the hydroquinone form. When the invention is used for extracting higher boiling mercaptans, such as propyl, butyl and other mercaptans having a higher number of carbon atoms in the molecule, it may be advisable during the regeneration stage to add lighter mercaptans to the alkali solution in order to permit the air to remove the heavier mercaptans substantially completely by oxidation, and leave lighter boiling mercaptans in the solution to protect the catalyst from over-oxidation. The total mercaptan sulfur remaining in the solution after regeneration should not exceed approximately 0.7%, and the total amount of mercaptans boiling above propyl mercaptan should not be more than about 0.2%. As previously pointed out, if care is not taken during the regeneration stage, not only does some of the catalyst remain in the solution in the quinone form which will cause oxidation of sulfur compounds in situ in the fluid to be treated, but a portion or all of the catalyst may be destroyed by oxidation.

Instead of using pure compounds as catalysts substances containing alkoxy hydroxy aromatic compounds of the type hereinbefore described may be used. One such substance is high boiling hard wood tar such as the fraction of maple or beechwood tar boiling between approximately 240 and 300° C. Such tars are known to contain mono-alkyl ethers of pyrogallol.

In order to function as catalysts compounds used in accordance with my invention should be soluble in the alkali solution. In the event the compound or substance is not soluble in the amount desired solubilizing agents may be added to cause the compound or substance to go into solution. For example, a small amount of commercial cresols will solubilize many compounds and substances in aqueous alkali solution.

It is to be understood that the rate of air blowing used in the specific examples herein disclosed is not to be considered as the most desirable rate for commercial operation. Obviously where large scale equipment is used the rate of air blowing will considerably exceed that used in the tests. The rate of air blowing may vary within wide limits and will be adjusted in accordance with the size and type of equipment used in the regeneration step to obtain most rapid regeneration with minimum loss of solution by carry-over in the exhaust air.

Either sweetening or air regeneration may be conducted at ordinary atmospheric temperatures. Temperatures between 60° F. and 130° F. are satisfactory. Lower or higher temperatures may be used. However, lower temperatures require longer periods for sweetening and regeneration, whereas, higher temperatures are not desirable because of the possibility of forming undesirable oxidation by-products.

This application is a continuation-in-part of my application Serial No. 537,969, which in turn is a continuation-in-part of application Serial No. 532,000 (now Patent No. 2,369,771); which in turn is a continuation-in-part of abandoned application Serial No. 421,250 filed December 1, 1941.

It is claimed:

1. The method of oxidizing acidic sulfur compounds of the type which occur in hydrocarbon oils comprising contacting said compounds with an oxidizing agent in the presence of an alkali solution containing a small amount of an oxidation promoter, said promoter being a dihydroxy-alkoxy benzene in which the hydroxy groups are adjacent to each other, and controlling the oxidation to prevent oxidative destruction of said promoter.

2. Method in accordance with claim 1 in which the alkoxy group is in position 1 and the hydroxy groups are in positions 2 and 3 on the benzene ring.

3. The method of sweetening hydrocarbon oil containing mercaptans comprising contacting said oil with oxygen-containing gas in the presence of an alkali solution containing a small amount of an oxidation promoter, said promoter being a dihydroxy-alkoxy benzene in which the hydroxy groups are adjacent to each other, and controlling the oxidation to prevent oxidative destruction of said promoter.

4. Method in accordance with claim 3 in which the promoter is a propoxy catechol.

5. Method in accordance with claim 3 in which the promoter is 3-isopropoxy catechol.

6. The method of regenerating alkali solution containing acidic sulfur compounds extracted from hydrocarbon fluid immiscible with said solution comprising contacting said solution with oxygen-containing gas in the presence of a small amount of an oxidation promoter, said promoter being a dihydroxy-alkoxy benzene in which the hydroxy groups are adjacent to each other, and controlling the oxidation to prevent oxidative destruction of said promoter, and removing the oxidized sulfur compounds from the solution.

7. Method in accordance with claim 6 in which the alkoxy group is in position 1 and the hydroxy groups are in positions 2 and 3 on the benzene ring.

8. Method in accordance with claim 6 in which the promoter is a propoxy catechol.

9. Method in accordance with claim 6 in which the promoter is 3-isopropoxy catechol.

10. The method of oxidizing acidic sulfur compounds of the type which occur in hydrocarbon oils comprising contacting said compounds with an oxidizing agent in the presence of an alkali solution containing a small amount of a propoxy catechol as an oxidation promoter and controlling the oxidation to prevent oxidative destruction of the promoter.

11. Method in accordance with claim 10 in which the promoter is 3-isopropoxy catechol.

DONALD C. BOND.

REFERENCES CITED

The following references are of record in the file of this patent:

UNITED STATES PATENTS

| Number | Name | Date |
|---|---|---|
| 1,855,353 | Jacobsen | Apr. 26, 1932 |
| 2,015,038 | Pevere | Sept. 17, 1935 |
| 2,080,654 | Craig | May 18, 1937 |
| 2,315,530 | Loyd | Apr. 6, 1943 |

FOREIGN PATENTS

| Number | Country | Date |
|---|---|---|
| 126,544 | Hungary | Mar. 17, 1941 |